(12) United States Patent
Islam et al.

(10) Patent No.: US 12,469,377 B2
(45) Date of Patent: Nov. 11, 2025

(54) CONTEXT-BASED REMINDER SYSTEM FOR A VEHICLE

(71) Applicant: GM Global Technology Operations LLC, Detroit, MI (US)

(72) Inventors: Md Mhafuzul Islam, Warren, MI (US); Arun Adiththan, Sterling Heights, MI (US); Richard Romano, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 18/455,973

(22) Filed: Aug. 25, 2023

(65) Prior Publication Data

US 2025/0069491 A1 Feb. 27, 2025

(51) Int. Cl.
- *G08B 21/24* (2006.01)
- *B60K 35/22* (2024.01)
- *B60K 35/26* (2024.01)
- *B60K 35/28* (2024.01)

(52) U.S. Cl.
CPC .............. *G08B 21/24* (2013.01); *B60K 35/22* (2024.01); *B60K 35/265* (2024.01); *B60K 35/28* (2024.01)

(58) Field of Classification Search
CPC .. G08B 21/24; B60K 35/00; B60K 2360/592; B60K 35/265; B60K 2360/164; B60K 35/22; B60K 35/28; B60W 50/14; B60W 2050/146
See application file for complete search history.

(56) References Cited

U.S. PATENT DOCUMENTS

| | | | | |
|---|---|---|---|---|
| 2016/0189444 A1* | 6/2016 | Madhok | ................... | G07C 5/02 701/36 |
| 2017/0336920 A1* | 11/2017 | Chan | .................... | G07C 5/0825 |
| 2022/0126864 A1* | 4/2022 | Moustafa | .............. | B60W 40/09 |

FOREIGN PATENT DOCUMENTS

DE 202016107361 U1 8/2017

OTHER PUBLICATIONS

Wikipedia: "Clusteranalyse", https://de.m.wikipedia.org/w/index.php?oldi&title=Clusteranalyse, Accessed May 31, 2024.

* cited by examiner

Primary Examiner — Brian Wilson
(74) Attorney, Agent, or Firm — Vivacqua Crane, PLLC

(57) ABSTRACT

A context-based reminder system that determines a context-based reminder conveyed to an occupant of a vehicle includes a back-end server in wireless communication with one or more controllers that are part of the vehicle by a communication network. The back-send server receives, over the communication network, data indicative of a vehicle-oriented context and a user-oriented context from the one or more controllers of the vehicle and determines the context-based reminder based on the vehicle-oriented context and the user-oriented context. An output device of the vehicle creates a notification to the occupant indicative of the context-based reminder.

20 Claims, 2 Drawing Sheets

CONTEXT-BASED REMINDER SYSTEM FOR A VEHICLE

INTRODUCTION

The present disclosure relates to a context-based reminder system that determines a context-based reminder that is conveyed to an occupant of a vehicle, where the context-based reminder is generated based on vehicle-oriented context and user-oriented context.

Many vehicles include various types of reminder systems that provide reminders to the occupants of a vehicle. One type of reminder is a rear seat reminder, which reminds the occupants of a vehicle to check the rear seat before exiting the vehicle for objects that they may have accidentally forgotten. As another example, many vehicles may include maintenance reminder systems that provide reminders regarding a vehicle's maintenance schedule. Specifically, for example, a maintenance reminder system may remind the occupants of a vehicle of an upcoming oil change or tire rotation. However, it is to be appreciated that there are still many events and items that an occupant of the vehicle may inadvertently forget. For example, occupants of a vehicle may forget to bring their identification badge before leaving their residence to gain access to an office building or a wholesale membership card for access to a wholesale club that is a retail store.

Thus, while current reminder systems achieve their intended purpose, there is a need in the art for an improved reminder system that considers items or events an occupant of the vehicle may inadvertently forget.

SUMMARY

According to several aspects, a context-based reminder system that determines a context-based reminder conveyed to an occupant of a vehicle is disclosed. The context-based reminder system includes a back-end server in wireless communication with one or more controllers that are part of the vehicle by a communication network. The vehicle includes an output device in electronic communication with the one or more controllers. The back-end server executes instructions to receive, over the communication network, data indicative of a vehicle-oriented context and a user-oriented context from the one or more controllers of the vehicle. The back-end server determines a set of user contextual factors based on the vehicle-oriented context and a set of vehicle contextual factors based on the user-oriented context. The back-end server fuses together the set of user contextual factors with the set of vehicle contextual factors to create a set of fused context factors, where each fused context factor that is part of the set of fused context factors correspond to at least one potential context-based reminder that is part of the set of context-based reminders. The back-end server creates a plurality of matched pairs, where each matched pair includes a fused context reminder and at least one corresponding potential context-based reminder. The back-end server assigns a score to each of the plurality of matched pairs based on a clustering algorithm, compares the score of each matched pair with a threshold score, and in response to determining the score associated with a matched pair is greater than the threshold score, sets the corresponding potential context-based reminder as the context-based reminder. The output device of the vehicle creates a notification to the occupant indicative of the context-based reminder.

In an aspect, the set of fused context factors represents a tensor product of the set of user contextual factors and the set of vehicle contextual factors.

In another aspect, the vehicle-oriented context refers to one or more vehicle contextual factors that affect the vehicle while traveling to a specific destination during a specified duration of time.

In yet another aspect, the vehicle contextual factors include one or more of the following: a vehicle identifier, a fuel status, a geographical location of the vehicle, a battery charge status, oil life, spare tire status, and tire pressure.

In an aspect, the user-oriented context refers to one or more occupant contextual factors regarding the occupant of the vehicle.

In another aspect, the user-oriented context includes one or more of the following: a user identifier, time of day, day or night status, a disability status, length of a journey for the occupant, and a distance between the occupant and a specific destination.

In yet another aspect, the back-end server is in wireless communication with a plurality of other vehicles, where each other vehicle includes a corresponding context-based reminder system as well.

In an aspect, a clustering algorithm creates a plurality of data clusters based on outside data collected by the plurality of other vehicles, where the outside data includes other vehicle-oriented context pertaining to a specific one of the plurality of other vehicles and outside user-oriented context pertaining to an occupant of the specific one of the plurality of other vehicles.

In another aspect, the plurality of data clusters are either time-specific data clusters or geo-specific data clusters.

In yet another aspect, the matched pair is represented by a data point assigned to one of the plurality of data clusters created by the clustering algorithm.

In an aspect, the score assigned to a matched pair indicates a distance measured from the data point representing the matched pair and a center of a specific cluster.

In another aspect, the threshold score represents a maximum allowable radius of the specific cluster.

In yet another aspect, the back-end server executes instructions to receive a signal over the communication network from the one or more controllers of the vehicle, where the signal includes user-generated feedback created by the occupant.

In an aspect, the back-end server executes instructions to in response to receiving the signal, refine the context-based reminder corresponding to the matched pair based on one or more machine learning algorithms to create a refined context-based reminder that is part of the matched pair.

In another aspect, refining the context-based reminder includes modifying one or more of the following: a timing of the notification, the content of a message conveyed by the notification, and a modality delivering the notification.

In yet another aspect, a method for determining a context-based reminder conveyed to an occupant of a vehicle by a context-based reminder system is disclosed. The method includes receiving, over a communication network by a back-end server, data indicative of a vehicle-oriented context and a user-oriented context from one or more controllers of a vehicle, where the back-end server is in wireless communication with the one or more controllers of the vehicle by the communication network. The method includes determining, by the back-end server, a set of user contextual factors based on the vehicle-oriented context and a set of vehicle contextual factors based on the user-oriented context. The method also includes fusing, by the back-end server, together the set of user contextual factors with the set of vehicle contextual factors to create a set of fused context factors, where each fused context factor that is part of the set of fused context factors correspond to at least one potential context-based reminder that is part of the set of context-based reminders. The method also includes creating, by the back-end server, a plurality of matched pairs, where each matched pair includes a fused context reminder and at least one corresponding potential context-based reminder. The method includes assigning a score to each of the plurality of matched pairs based on a clustering algorithm. The method also includes comparing the score of each matched pair with a threshold score. In response to determining the score associated with a matched pair is greater than the threshold score, the method includes setting the corresponding potential context-based reminder as the context-based reminder, where an output device of the vehicle creates a notification to the occupant indicative of the context-based reminder.

In another aspect, a context-based reminder system that determines a context-based reminder conveyed to an occupant of a vehicle. The context-based reminder system includes a back-end server in wireless communication with one or more controllers that are part of the vehicle by a communication network. The vehicle includes an output device in electronic communication with the one or more controllers. The back-end server executes instructions to receive, over the communication network, data indicative of a vehicle-oriented context and a user-oriented context from the one or more controllers of the vehicle. The back-end server determines a set of user contextual factors based on the vehicle-oriented context and a set of vehicle contextual factors based on the user-oriented context, where the vehicle-oriented context refers to one or more vehicle contextual factors that affect the vehicle while traveling to a specific destination during a specified duration of time and the user-oriented context refers to one or more occupant contextual factors regarding the occupant of the vehicle. The back-end server fuses together the set of user contextual factors with the set of vehicle contextual factors to create a set of fused context factors, where each fused context factor that is part of the set of fused context factors correspond to at least one potential context-based reminder that is part of the set of context-based reminders, and where the set of fused context factors represents a tensor product of the set of user contextual factors and the set of vehicle contextual factors. The back-end server creates a plurality of matched pairs, where each matched pair includes a fused context reminder and at least one corresponding potential context-based reminder. The back-end server assigns a score to each of the plurality of matched pairs based on a clustering algorithm, compares the score of each matched pair with a threshold score, and in response to determining the score associated with a matched pair is greater than the threshold score, sets the corresponding potential context-based reminder as the context-based reminder, where the output device of the vehicle creates a notification to the occupant indicative of the context-based reminder.

In another aspect, the vehicle contextual factors include one or more of the following: a vehicle identifier, a fuel status, a geographical location of the vehicle, a battery charge status, oil life, spare tire status, and tire pressure.

In yet another aspect, the user-oriented context includes one or more of the following: a user identifier, time of day, day or night status, a disability status, length of a journey for the occupant, and a distance between the occupant and a specific destination.

In an aspect, the back-end server is in wireless communication with a plurality of other vehicles, where each other vehicle includes a corresponding context-based reminder system as well.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
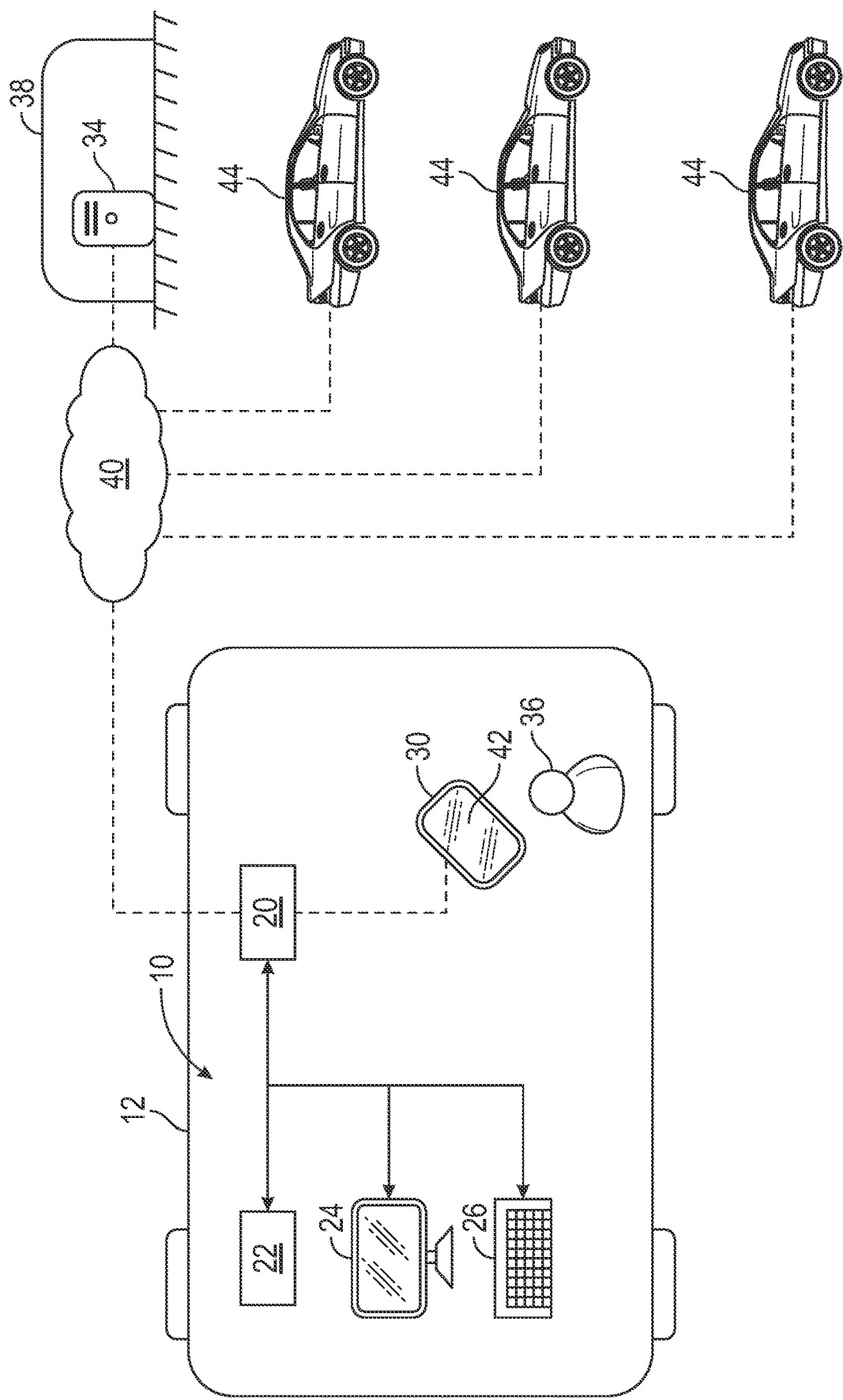
FIG. 1 is a schematic diagram of the disclosed context-based reminder system including a back-end server in wireless communication with one or more controllers that are part of a vehicle, according to an exemplary embodiment.

Referring to FIG. 1, a schematic diagram of an exemplary context-based reminder system 10 for a vehicle 12 is illustrated. It is to be appreciated that the vehicle 12 may be any type of vehicle such as, but not limited to, a sedan, truck, sport utility vehicle, van, or motor home. The context-based reminder system 10 includes one or more controllers 20 in electronic communication with a vehicle bus 22, an output device 24, and a user input device 26. The one or more controllers 20 are in wireless communication with a personal electronic device 30 associated with an occupant 36 of the vehicle 12. The one or more controllers 20 are also in wireless communication with a back-end server 34 over a communication network 40, where the back-end server 34 is remotely located from the vehicle 12 as part of a back-end office 38. The back-end server 34 represents one or more computers that each include at least one processor, memory, associated input and output buses, and wireless communication capabilities. The communication network 40 also wirelessly connects the back-end server 34 with a plurality of other vehicles 44. The other vehicles 44 represent vehicles 44 that are not associated with the occupant 36 of the vehicle 12 (i.e., the ego vehicle). It is to be appreciated that each other vehicle 44 also includes a corresponding context-based reminder system as well.

The vehicle bus 22 is any type of vehicle bus that allows for the one or more controllers 20 to send and receive data from other controllers located within the vehicle 12. The other controllers are part of other systems and subsystems that are part of the vehicle 12 such as, for example, a navigation system, an infotainment system, a driver monitoring system, and advanced driver assistant systems. The vehicle bus 22 may be, for example, a controller area network (CAN bus). The output device 24 is any type of electronic output device that creates a notification to the occupant 36, where the notification includes audible content, visual content, or both audible and visual content. For example, in one embodiment, the output device 24 is a display that shows graphics and images such as, for example, a liquid crystal display (LCD), where the context-based reminder is shown upon the display. In another embodiment, the output device 24 is a speaker that emits an audible notification to the occupant 36 of the vehicle 12, where the context-based reminder is an audio recording that the occupant 36 hears over the speaker. In embodiments, the output device 24 includes more than one device, and may be a multi-modal device that creates a notification based on two or more modalities (i.e., audio and visual content).

The user input device 26 is any type of device for receiving user input such as, for example, a touchscreen, a keypad, or a microphone. The personal electronic device 30 is any type of portable electronic device including a touchscreen 42, one or more processors, and wireless communication capabilities, where the personal electronic device 30 is sized to be carried by the occupant 36 on his or her person such as, but not limited to, a smartphone, a laptop, or a tablet computer.

As explained below, the context-based reminder system 10 determines a context-based reminder that is conveyed to the occupant 36 of the vehicle 12 by the output device 24. The context-based reminder is determined based on both vehicle-oriented context and user-oriented context. Thus, the context-based reminder is not a user-generated reminder created explicitly by the occupant 36. Instead, it is to be appreciated that the context-based reminder system 10 is a smart system that determines the context-based reminders based on vehicle-oriented context corresponding to the vehicle 12 and user-oriented context related to the occupant 36. In contrast to the context-based reminder, a user-generated reminder is manually created as a user enters one or more parameters that define the user-generated reminder. For example, the parameters may indicate the user-defined reminder is triggered every weekday morning at 7 am reminding the user to bring his or her identification badge to gain access to their place of employment.

The vehicle-oriented context refers to one or more vehicle contextual factors that affect the vehicle 12 while traveling to a specific destination during a specified duration of time. Some examples of the vehicle contextual factors of the vehicle-oriented context include, but are not limited to, a vehicle identifier, a fuel status, a geographical location of the vehicle 12, a battery charge status, oil life, spare tire status, and tire pressure. The vehicle identifier is unique to a specific vehicle and in an embodiment may be a vehicle identification number (VIN). As an example, if the specific destination is a vacation resort several hours away and the specified duration of time the weekend, then the vehicle contextual factors include the vehicle identifier, oil life, and tire pressure. The one or more controllers 20 receive data indicative of the vehicle-oriented context from the vehicle bus 22.

The user-oriented context refers to one or more user contextual factors regarding the occupant 36 of the vehicle 12. The one or more controllers 20 receive data indicative of the user-oriented context by providing input to the user input device 26 and from the one or more personal electronic devices 30. Some examples of user-oriented context include, but are not limited to, a user identifier, time of day, day or night status, a disability status, length of a journey for the occupant 36, and a distance between the occupant 36 and the specific destination. For example, the one or more controllers 20 may receive data indicative of the length of the journey for the occupant 36 from a navigation system that is part of the vehicle 12 over the vehicle bus 22.

Figure 2:
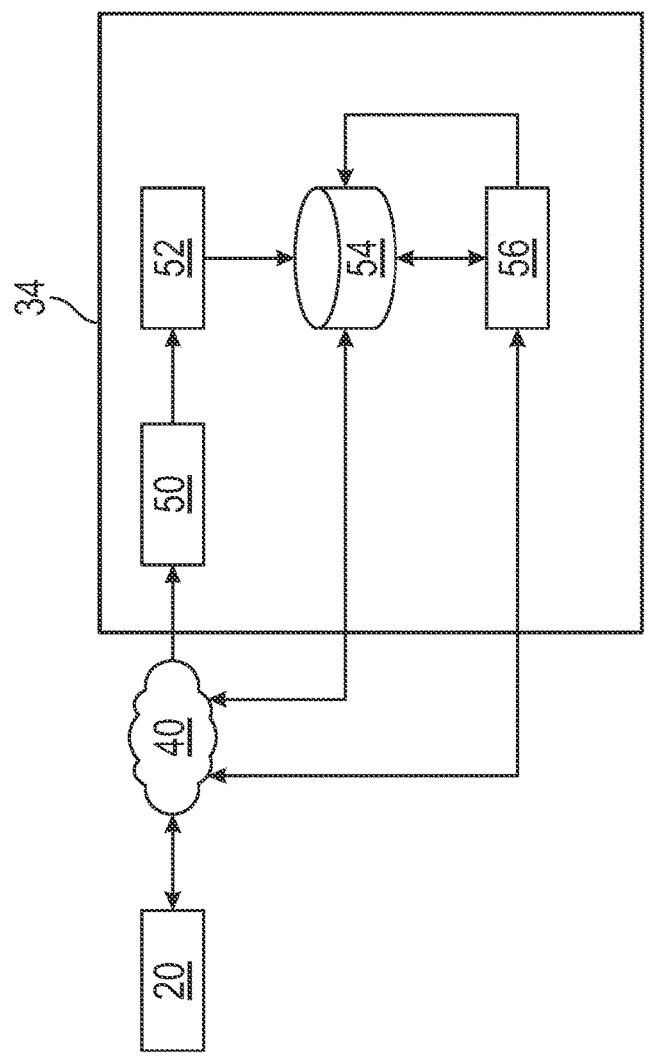
FIG. 2 is a block diagram of the software architecture of the back-end server shown in FIG. 1, according to an exemplary embodiment.

FIG. 2 illustrates the software architecture of the back-end server 34. The back-end server 34 includes a fusion module 50, an analysis module 52, a recommendation database 54, and a refinement module 56. The fusion module 50 of the back-end server 34 receives data indicative of the vehicle-oriented context and the user-oriented context from the one or more controllers 20 that are part of the vehicle 12 over the communication network 40.

The fusion module 50 of the one or more controllers 20 determine a set of potential context-based reminders R based on the data indicative of the vehicle-oriented context and the user-oriented context received over the communication network 40, where there are an p number of potential context-based reminders, or $$R = \{R_i^1, R_i^2, \ldots R_i^p\}.$$

Specifically, first the fusion module 50 determines a set of user contextual factors $CU_i$ based on the vehicle-oriented context and a set of vehicle contextual factors $CV_i$ based on the user-oriented context. $U_i$ represents a unique user identifier corresponding to the occupant 36, where $$CU_i = \{CU_i^1, CU_i^2, \ldots CU_i^n\},$$

where n represents an n number of user contextual factors, and $V_i$ represents a unique vehicle identifier corresponding to the vehicle 12, where $$CV_i = \{CV_i^1, CV_i^2, \ldots CV_i^m\}$$

and m represents an m number of vehicle contextual factors.

The fusion module 50 of the back-end server 34 then fuses together the set of user contextual factors $CU_i$ with the set of vehicle contextual factors $CV_i$ to determine a set of fused context factors $$FC_u^v, \text{ where } FC_u^v = \{FC_1, FC_2, FC_{n \times m}\}.$$

The set of fused context factors $$FC_u^v$$

represents a tensor product of the set of user contextual factors $CU_i$ and the set of vehicle contextual factors $CV_i$, or $$FC_u^v = \{CU_i^1, CU_i^2, \ldots CU_i^n\} \otimes \{CV_i^1, CV_i^2, \ldots CV_i^m\},$$

where each fused context factor that is part of the set of fused context factors $$FC_u^v$$

corresponds to at least one potential context-based reminder that is part of the set of context-based reminders R. It is to be appreciated that for purposes of explanation, the set of vehicle contextual factors $CV_i$ are based on the vehicle 12 (shown in FIG. 1). However, it is to be appreciated that the occupant 36 of the vehicle 12 may be associated with multiple vehicles, and each vehicle will include its own set of vehicle contextual factors $CV_j$. It is also to be appreciated that each vehicle may also be associated with more than one occupant 36 as well.

As an example, if the occupant 36 is planning a long trip, then the set of user contextual factors $CU_i$ include $$CU_{uid}^1 = 1, \text{ where } CU_{uid}^1$$

represents the user identifier and $$CU_{uid}^2 = \text{November } 24 - 27, \text{ where } CU_{uid}^2$$

represents the length of a journey for the occupant 36. The set of vehicle contextual factors include $$CV_{vin}^1 = 0.25, \text{ where } CV_{vin}^1$$

represents fuel status, $$CV_{vin}^2 = 1, \text{ where } CV_{vin}^2$$

represents the tire pressure, and $$CV_{vin}^3 = 1, \text{ where } CV_{vin}^2$$

represents a spare tire status. The set of potential context-based reminders R include $$R_i^1 = \text{fill up gas tank}, R_i^2 = \text{carry identification card},$$

$$\text{and } R_i^p = \text{pack winter clothing.}$$

The fusion module 50 of the back-end server 34 then creates a plurality of matched pairs, where each matched pair includes a fused context reminder and at least one corresponding potential context-based reminder, where the matched pair is expressed as $$\langle FC_u^v, R_i^p \rangle.$$

The analysis module 52 of the back-end server 34 receives the plurality of matched pairs as input and assigns a score to each of the plurality of matched pairs based on a clustering algorithm. It is to be appreciated that the clustering algorithm may include either supervised or unsupervised learning techniques. The clustering algorithm creates a plurality of data clusters based on outside data collected by the plurality of other vehicles 44 (FIG. 1), where the outside data includes other vehicle-oriented context pertaining to a specific one of the plurality of other vehicles 44 and outside user-oriented context pertaining to an occupant of the specific one of the plurality of other vehicles 44.

Each matched pair is represented by a data point assigned to one of the plurality of data clusters created by the clustering algorithm. The plurality of data clusters are either time-specific data clusters or geo-specific data clusters. The time-specific data clusters classify each matched pair as a data point that is part of one of the time-specific data clusters based on a specific time the potential context-based reminder is triggered. The specific time refers to a time of day or, alternatively, a specific day of the week or date. For example, the time of day may refer to weekday mornings between 7 to 9 am, where the occupant 36 drives to his or her place of employment. The geo-specific data clusters refer to a specific destination that triggers the potential context-based reminder. For example, if the destination is an airport, then the potential context-based reminder would be triggered to remind the occupant 36 to bring a passport, boarding pass, and baggage.

The score assigned to a matched pair indicates a distance measured from the data point representing the matched pair and a center of a specific cluster. Therefore, the score assigned to the matched pair indicates an accuracy of the specific cluster the data point is assigned to. The analysis module 52 of the back-end server 34 compares the score assigned to the matched pair with a threshold score. The threshold score represents a maximum allowable radius of the specific cluster, where the maximum allowable radius is determined based on a maximum allowable size of the specific cluster. In response to determining the score assigned to the matched pair is greater than the threshold score, the analysis module 52 of the back-end server 34 sets the corresponding potential context-based reminder corresponding to the matched pair as the context-based reminder, and the matched pair is saved in the recommendation database 54.

Referring to both FIGS. 1 and 2, the contents of the recommendation database 54 of the back-end server 34 are shared with the one or more controllers 20 of the vehicle 12. The one or more controllers 20 of the vehicle 12 monitor the vehicle bus 22 for a trigger event, where the one or more controllers 20 instruct the output device 24 to generate a notification to the occupant 36 of the vehicle 12 indicative of the context-based reminder in response to detecting the trigger event. As mentioned above, the notification includes audible content, visual content, or both audible and visual content.

Continuing to refer to FIGS. 1 and 2, the trigger event is represented by the occupant 36 entering the vehicle 12, during shutdown of the vehicle 12, or during startup of the vehicle 12, where startup may include activating the accessory mode. The one or more controllers 20 receive a signal indicative of the trigger event from the vehicle bus 22, where the output device 24 of the vehicle 12 creates the notification to the occupant indicative of the context-based reminder in response to receiving the signal indicating the trigger event. It is to be appreciated that information conveyed by the notification is formatted based on context.

The one or more controllers 20 receive user-generated feedback created by the occupant 36 indicating a level of effectiveness of the context-based reminder. The user-generated feedback is created either explicitly by the occupant 36 or implicitly by the occupant 36. The user-generated feedback is explicitly created when the occupant 36 enters user input into the user input device 26 indicating a level of effectiveness of the context-based reminder, or by accepting or rejecting the context-based reminder. The user-generated feedback is created implicitly based on one or more affirmative actions from the occupant 36 such as, for example, navigating the vehicle 12 to the destination associated with the reminder, shifting the vehicle 12 out of Park, or opening a door of the vehicle 12. For example, if the occupant 36 shifts the vehicle 12 out of Park without accepting the context-based reminder, the one or more controllers 20 receives implicitly created user-generated feedback in the form of a signal over the vehicle bus 22 indicating the occupant 36 shifted the vehicle 12 out of Park without accepting the context-based reminder.

In one embodiment, three levels of effectiveness are provided for the context-based reminder, where the levels of effectiveness include helpful, not helpful, or partially helpful. The occupant 36 may indicate the context-based reminder is partially helpful by providing user input to the user input device 26. For example, the occupant 36 may provide user input indicating an assessment score ranging from one to ten, where one indicates the context-based reminder was completely unhelpful and ten indicates the context-based reminder was completely helpful.

In response to receiving the user-generated feedback created by the occupant 36 indicating the level of effectiveness of the context-based reminder, the one or more controllers 20 transmit a signal over the communication network 40 to the back-end server 34, where the signal includes the user-generated feedback. In an embodiment, in response to receiving the signal, the back-end server 34 refines the context-based reminder corresponding to the matched pair saved in the recommendation database 54, which is explained below. Specifically, as shown in FIG. 2, the refinement module 56 of the back-end server 34 receives the signal including the user-generated feedback as input along with the matched pair from the recommendation database 54 and a profile of the occupant 36. The profile of the occupant 36 indicates user-specific information of the occupant 36 such as, for example, a place of employment, a place of residence, and a total number of family members for the occupant 36.

The refinement module 56 refines the context-based reminder corresponding to the matched pair saved in the recommendation database 54 based on one or more machine learning algorithms to create a refined context-based reminder that is part of the matched pair, where the one or more machine learning algorithms consider the user-generated feedback and the profile of the occupant. In another embodiment, a regression model creates the refined context-based reminder that is part of the matched pair. Refining the context-based reminder corresponding to the matched pair includes modifying the context-based reminder or, alternatively, removing the context-based reminder from the recommendation database 54 in response to receiving the user-generated feedback. For example, in one embodiment, if the context-based reminder includes reminding the occupant 36 to take a wholesale membership card when the destination is a wholesale club and the user-generated feedback indicates the reminder is completely unhelpful, then the refinement module 56 may remove the context-based reminder from the recommendation database 54.

Modifying the context-based reminder shall now be described. In an embodiment, the notification includes an option to edit the context-based reminder based on information provided by the user-generated feedback created by the occupant 36. For example, in one embodiment, the notification includes an option to accept, modify the timing of the reminder (e.g., a snooze button), or dismiss the reminder. In another embodiment, the notification includes an option to edit the content of a message conveyed by the notification. For example, if the context-based reminder is a message stating 'bring your identification badge to work', and if the user-generated feedback created by the occupant 36 indicates that he or she would like to also be reminded to bring a lunchbox to work, then the context of the message conveyed by the notification is modified to state 'bring your identification badge and your lunchbox to work'. In still another embodiment, the notification includes an option to modify the modality delivering the notification. For example, if the notification generated by the output device 24 is a visual notification shown upon a display and an audio notification played over a speaker and the user-generated feedback created by the occupant 36 indicates the occupant would prefer to receive only an audio notification, then the notification is generated over the speaker only. Thus, the context-based reminder is refined by modifying at least one of the following: the timing of the notification, the content of a message conveyed by the notification, and modifying the modality delivering the notification.

Figure 3:
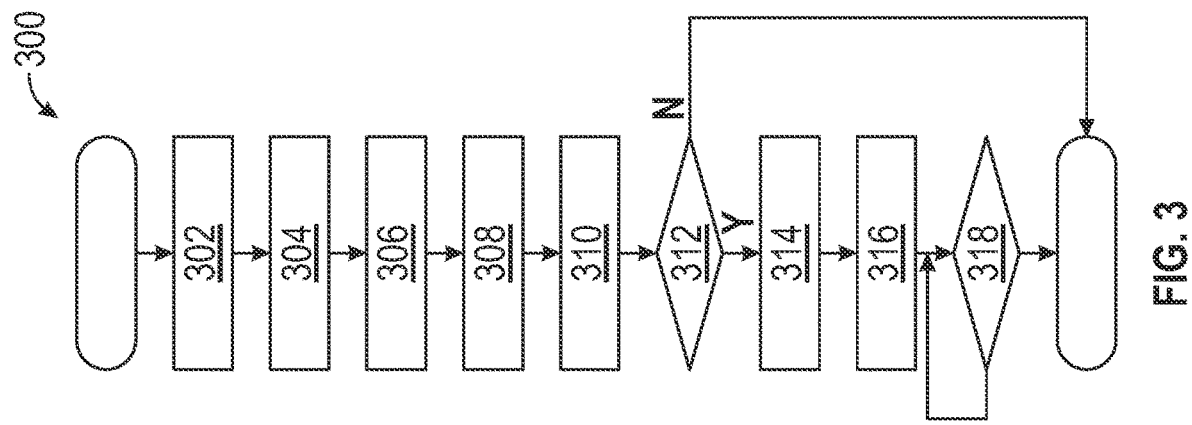
FIG. 3 is a process flow diagram illustrating a method for determining a context-based reminder by the context-based reminder system illustrated in FIG. 1, according to an exemplary embodiment.

FIG. 3 is a process flow diagram illustrating a method 300 for determining the context-based reminder by the context-based reminder system 10. Referring generally to FIGS. 1-3, the method 300 may begin at decision block 302. In block 302, the fusion module 50 of the back-end server 34 receives, over the communication network 40, data indicative of the vehicle-oriented context and the user-oriented context from the one or more controllers 20 of the vehicle 12. The method 300 may then proceed to block 304.

In block 304, the fusion module 50 of the back-end server 34 determines the set of user contextual factors $CU_i$ based on the vehicle-oriented context and the set of vehicle contextual factors $CV_i$ based on the user-oriented context. The method 300 may then proceed to block 306.

In block 306, the fusion module 50 of the back-end server 34 fuses together the set of user contextual factors $CU_i$ with the set of vehicle contextual factors $CV_i$ to create the set of fused context factors $FC_u^v$, where each fused context factor that is part of the set of fused context factors $FC_u^v$ correspond to at least one potential context-based reminder that is part of the set of fused context factors $FC_u^v$. The method 300 may then proceed to block 308.

In block 308, the fusion module 50 of the back-end server 34 creates the plurality of matched pairs, where each matched pair includes a fused context reminder and at least one corresponding potential context-based reminder. The method 300 may then proceed to block 310.

In block 310, the analysis module 52 of the back-end server 34 assigns a score to each of the plurality of matched pairs based on a clustering algorithm. The method 300 may then proceed to decision block 312.

In decision block 312, the analysis module 52 of the back-end server 34 compares the score of each matched pair with the threshold score. In response to determining the score is less than or equal to the threshold score, the method 300 may then terminate. However, in response to determining the score associated with a matched pair is greater than the threshold score, the method 300 proceeds to block 314.

In block 314, the analysis module 52 of the back-end server 34 sets the corresponding potential context-based reminder as the context-based reminder, where the output device 24 of the vehicle 12 creates a notification to the occupant 36 indicative of the context-based reminder. The method 300 may then proceed to block 316.

In block 316, the matched pair is saved in the recommendation database 54 of the back-end server 34, where the contents of the recommendation database 54 of the back-end server 34 are shared with the one or more controllers 20 of the vehicle 12. The method 300 may then proceed to decision block 318.

In block 318, the one or controllers 20 of the vehicle 12 monitor the vehicle bus 22 for a trigger event. In response to detecting the trigger event, the one or more controllers 20 instruct the output device 24 to generate a notification to the occupant 36 of the vehicle 12 indicative of the context-based reminder. The method 300 may then terminate.

Referring generally to the figures, the disclosed context-based reminder system provides various technical effects and benefits. It is to be appreciated that the context-based reminder is not a user-generated reminder created explicitly by a user. Instead, the context-based reminder system is a smart system that determines the context-based reminders based on vehicle-oriented context corresponding to the vehicle and user-oriented context related to the occupant. The context-based reminder system also provides an approach for communicating the context-based reminder, which is part of a back-end office, to the occupant of the vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A context-based reminder system that determines a context-based reminder conveyed to an occupant of a vehicle, the context-based reminder system comprising:
    a back-end server in wireless communication with one or more controllers that are part of the vehicle by a communication network, wherein the vehicle includes an output device in electronic communication with the one or more controllers, wherein the back-end server executes instructions to:
        receive, over the communication network, data indicative of a vehicle-oriented context and a user-oriented context from the one or more controllers of the vehicle;
        determine a set of user contextual factors based on the vehicle-oriented context and a set of vehicle contextual factors based on the user-oriented context;
        fuse together the set of user contextual factors with the set of vehicle contextual factors to create a set of fused context factors, wherein each fused context factor that is part of the set of fused context factors correspond to at least one potential context-based reminder that is part of a set of context-based reminders;
        create a plurality of matched pairs, wherein each matched pair includes a fused context reminder and at least one corresponding potential context-based reminder;
        assign a score to each of the plurality of matched pairs based on a clustering algorithm;
        compare the score of each matched pair with a threshold score; and
        in response to determining the score associated with a matched pair is greater than the threshold score, set the corresponding potential context-based reminder as the context-based reminder, wherein the output device of the vehicle creates a notification to the occupant indicative of the context-based reminder.

2. The context-based reminder system of claim 1, wherein the set of fused context factors represents a tensor product of the set of user contextual factors and the set of vehicle contextual factors.

3. The context-based reminder system of claim 1, wherein the vehicle-oriented context refers to one or more vehicle contextual factors that affect the vehicle while traveling to a specific destination during a specified duration of time.

4. The context-based reminder system of claim 3, wherein the vehicle contextual factors include one or more of the following: a vehicle identifier, a fuel status, a geographical location of the vehicle, a battery charge status, oil life, spare tire status, and tire pressure.

5. The context-based reminder system of claim 1, wherein the user-oriented context refers to one or more occupant contextual factors regarding the occupant of the vehicle.

6. The context-based reminder system of claim 5, wherein the user-oriented context includes one or more of the following: a user identifier, time of day, day or night status, a disability status, length of a journey for the occupant, and a distance between the occupant and a specific destination.

7. The context-based reminder system of claim 1, wherein the back-end server is in wireless communication with a plurality of other vehicles, wherein each other vehicle includes a corresponding context-based reminder system as well.

8. The context-based reminder system of claim 7, wherein a clustering algorithm creates a plurality of data clusters based on outside data collected by the plurality of other vehicles, wherein the outside data includes other vehicle-oriented context pertaining to a specific one of the plurality of other vehicles and outside user-oriented context pertaining to an occupant of the specific one of the plurality of other vehicles.

9. The context-based reminder system of claim 8, wherein the plurality of data clusters are either time-specific data clusters or geo-specific data clusters.

10. The context-based reminder system of claim 9, wherein the matched pair is represented by a data point assigned to one of the plurality of data clusters created by the clustering algorithm.

11. The context-based reminder system of claim 10, wherein the score assigned to a matched pair indicates a distance measured from the data point representing the matched pair and a center of a specific cluster.

12. The context-based reminder system of claim 11, wherein the threshold score represents a maximum allowable radius of the specific cluster.

13. The context-based reminder system of claim 1, wherein the back-end server executes instructions to:

receive a signal over the communication network from the one or more controllers of the vehicle, wherein the signal includes user-generated feedback created by the occupant.

14. The context-based reminder system of claim 13, wherein the back-end server executes instructions to:
in response to receiving the signal, refine the context-based reminder corresponding to the matched pair based on one or more machine learning algorithms to create a refined context-based reminder that is part of the matched pair.

15. The context-based reminder system of claim 14, wherein refining the context-based reminder includes modifying one or more of the following: a timing of the notification, a content of a message conveyed by the notification, and a modality delivering the notification.

16. A method for determining a context-based reminder conveyed to an occupant of a vehicle by a context-based reminder system, the method comprising:
receiving, over a communication network by a back-end server, data indicative of a vehicle-oriented context and a user-oriented context from one or more controllers of a vehicle, wherein the back-end server is in wireless communication with the one or more controllers of the vehicle by the communication network;
determining, by the back-end server, a set of user contextual factors based on the vehicle-oriented context and a set of vehicle contextual factors based on the user-oriented context;
fusing, by the back-end server, together the set of user contextual factors with the set of vehicle contextual factors to create a set of fused context factors, wherein each fused context factor that is part of the set of fused context factors correspond to at least one potential context-based reminder that is part of a set of context-based reminders;
creating, by the back-end server, a plurality of matched pairs, where each matched pair includes a fused context reminder and at least one corresponding potential context-based reminder;
assigning a score to each of the plurality of matched pairs based on a clustering algorithm;
comparing the score of each matched pair with a threshold score; and
in response to determining the score associated with a matched pair is greater than the threshold score, setting the corresponding potential context-based reminder as the context-based reminder, wherein an output device of the vehicle creates a notification to the occupant indicative of the context-based reminder.

17. A context-based reminder system that determines a context-based reminder conveyed to an occupant of a vehicle, the context-based reminder system comprising:
a back-end server in wireless communication with one or more controllers that are part of the vehicle by a communication network, wherein the vehicle includes an output device in electronic communication with the one or more controllers, wherein the back-end server executes instructions to:
receive, over the communication network, data indicative of a vehicle-oriented context and a user-oriented context from the one or more controllers of the vehicle;
determine a set of user contextual factors based on the vehicle-oriented context and a set of vehicle contextual factors based on the user-oriented context, wherein the vehicle-oriented context refers to one or more vehicle contextual factors that affect the vehicle while traveling to a specific destination during a specified duration of time and the user-oriented context refers to one or more occupant contextual factors regarding the occupant of the vehicle;
fuse together the set of user contextual factors with the set of vehicle contextual factors to create a set of fused context factors, wherein each fused context factor that is part of the set of fused context factors correspond to at least one potential context-based reminder that is part of a set of context-based reminders, and wherein the set of fused context factors represents a tensor product of the set of user contextual factors and the set of vehicle contextual factors;
create a plurality of matched pairs, where each matched pair includes a fused context reminder and at least one corresponding potential context-based reminder;
assign a score to each of the plurality of matched pairs based on a clustering algorithm;
compare the score of each matched pair with a threshold score; and
in response to determining the score associated with a matched pair is greater than the threshold score, set the corresponding potential context-based reminder as the context-based reminder, wherein the output device of the vehicle creates a notification to the occupant indicative of the context-based reminder.

18. The context-based reminder system of claim 17, wherein the vehicle contextual factors include one or more of the following: a vehicle identifier, a fuel status, a geographical location of the vehicle, a battery charge status, oil life, spare tire status, and tire pressure.

19. The context-based reminder system of claim 17, wherein the user-oriented context includes one or more of the following: a user identifier, time of day, day or night status, a disability status, length of a journey for the occupant, and a distance between the occupant and a specific destination.

20. The context-based reminder system of claim 17, wherein the back-end server is in wireless communication with a plurality of other vehicles, wherein each other vehicle includes a corresponding context-based reminder system as well.

* * * * *